(12) United States Patent
Yang et al.

(10) Patent No.: US 11,838,636 B2
(45) Date of Patent: Dec. 5, 2023

(54) METHOD FOR COMPENSATING FOR VISUAL-MEASUREMENT TIME LAG OF ELECTRO-OPTICAL TRACKING SYSTEM

(71) Applicant: SOUTHEAST UNIVERSITY, Nanjing (CN)

(72) Inventors: Jun Yang, Nanjing (CN); Xiangyang Liu, Nanjing (CN); Jianliang Mao, Nanjing (CN); Shihua Li, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 560 days.

(21) Appl. No.: 17/253,558

(22) PCT Filed: Jul. 8, 2019

(86) PCT No.: PCT/CN2019/095061
§ 371 (c)(1),
(2) Date: Dec. 17, 2020

(87) PCT Pub. No.: WO2020/220469
PCT Pub. Date: Nov. 5, 2020

(65) Prior Publication Data
US 2021/0191344 A1 Jun. 24, 2021

(30) Foreign Application Priority Data
Apr. 30, 2019 (CN) .......................... 201910361221.4

(51) Int. Cl.
*H04N 23/695* (2023.01)
*G05B 11/32* (2006.01)
(Continued)

(52) U.S. Cl.
CPC .......... *H04N 23/695* (2023.01); *G05B 11/32* (2013.01); *G05B 11/42* (2013.01); *G05B 13/027* (2013.01)

(58) Field of Classification Search
CPC ...... H04N 23/695; G05B 11/32; G05B 11/42; G05B 13/027
See application file for complete search history.

(56) References Cited

U.S. PATENT DOCUMENTS
2001/0034560 A1  10/2001  Krogmann

FOREIGN PATENT DOCUMENTS
CN          1045028 A   *  9/1990  ............. A61F 9/008
CN        103878770 A      6/2014
(Continued)

*Primary Examiner* — Said M Elnoubi
(74) *Attorney, Agent, or Firm* — MUNCY, GEISSLER, OLDS & LOWE, P.C.

(57) ABSTRACT

The present invention provides a generalized proportional integral observer-based method for compensating for visual-measurement time lag of an electro-optical tracking system. For visual-measurement time lag present in an electro-optical tracking system, an improved generalized proportional integral observer-based feedback control method is used to mitigate the impact of the measurement time lag on the system and suppress kinematic uncertainty of the system. The core of the method lies in that an observer is used to estimate a state, uncertainty, and a difference of the system at a previous moment, a state and uncertainty of the system at a current moment are then calculated by using these estimated values and a state-space model of the system, and a control input of the system is finally acquired according to the estimated values of the state and uncertainty of the system at the current moment. The method mitigates the adverse impact of visual-measurement time lag on the system and enhances the uncertainty suppression and the tracking precision of the system.

7 Claims, 3 Drawing Sheets

(51) Int. Cl.
*G05B 11/42* (2006.01)
*G05B 13/02* (2006.01)

(56) References Cited

FOREIGN PATENT DOCUMENTS

| | | |
|---|---|---|
| CN | 104267743 A | 1/2015 |
| CN | 105786024 A | 7/2016 |
| CN | 106444386 A | 2/2017 |
| CN | 107894713 A | 4/2018 |
| CN | 108871374 A | 11/2018 |
| CN | 109001974 A | 12/2018 |
| CN | 109164709 A | 1/2019 |
| JP | H09-101822 A | 4/1997 |

* cited by examiner

METHOD FOR COMPENSATING FOR VISUAL-MEASUREMENT TIME LAG OF ELECTRO-OPTICAL TRACKING SYSTEM

BACKGROUND

Technical Field

The present invention relates to a method for compensating for visual-measurement time lag of an electro-optical tracking system, which belongs to the field of high-precision control technology for electro-optical tracking systems.

Related Art

An electro-optical tracking system is an apparatus that integrates optics, electricity, machinery, and control, and is widely applied to military and civilian fields. When the system is in a tracking mode, the visual axis of a mounted camera needs to remain aimed at a tracked target.

An electro-optical tracking platform is subject to control difficulties such as multi-source disturbance, parameter uncertainty, the maneuver of a tracked target, and visual-measurement time lag. In a two-axis inertially stabilized platform, the optical axis of a camera mounted on an inner frame is susceptible to interference due to the movement of a carrier, leading to considerable difficulty in electro-optical tracking control. In addition to the movement of the carrier, great kinematic uncertainty is also generated in the maneuver of the tracked target in space, especially during the tracking of a fast maneuvering target. Because the camera is used as a sensor in the system to obtain a miss distance of the tracked target, the processing of the image generates visual-measurement time lag, and the time lag reduces the stability and control precision of the system. To implement high-precision tracking control, it is necessary to consider both the visual-measurement time lag and the kinematic uncertainty in the system, and design a corresponding control method.

A Smith predictor is usually used in existing compensation for visual-measurement time lag of an electro-optical tracking system. However, models established in the system need to have very high precision in this method. It is very difficult to meet requirements in practical applications. In addition, only measurement time lag is processed in many methods, but kinematic uncertainty is not processed. As a result, the control precision of the system is reduced.

SUMMARY

To solve the foregoing problems, the present invention discloses a method for compensating for visual-measurement time lag of an electro-optical tracking system. In the method, a compound controller is designed by constructing an improved generalized proportional integral observer and combining the observer with a feedback linearization algorithm, to implement high-precision tracking of the electro-optical tracking system and suppression of kinematic uncertainty of the system. A specific technical solution of the compound controller is as follows:

step 1: installing a camera on an inner pitch frame of a two-axis inertially stabilized platform, connecting the camera to a host computer to form an electro-optical tracking system, shooting, by the camera, a tracked target in real time, extracting, by the host computer, a miss distance of the tracked target according to an image shot by the camera, and generating, by the two-axis inertially stabilized platform, a control input of the system according to the miss distance.

step 2: selecting the miss distance of the tracked target as a state of the system, and establishing a discrete-time state-space model considering visual-measurement time lag and kinematic uncertainty of the system:

$$\begin{cases} X(k+1) = X(k) + BU(k) + \Delta(k) \\ Y(k) = X(k-d) \end{cases},$$

where X(k) represents the state of the system, U(k) represents the control input of the system, $\Delta(k)$ represents the kinematic uncertainty of the system, Y(k) represents a measurement output of the system, d represents the visual-measurement time lag, B represents a control input matrix, and k represents a $k^{th}$ moment;

step 3: defining $H(k)=\Delta(k+1)-\Delta(k)$ as a difference of the kinematic uncertainty of the system, and constructing, according to the discrete-time state-space model established in step 2, an improved generalized proportional integral observer:

$$\begin{cases} Z_1(k+1) = Z_1(k) + BU(k-d) + Z_2(k) - L_1(Z_1(k) - Y(k)) \\ Z_2(k+1) = Z_2(k) + Z_3(k) - L_2(Z_1(k) - Y(k)) \\ Z_3(k+1) = Z_3(k) - L_3(Z_1(k) - Y(k)) \end{cases},$$

where $Z_1(k)$, $Z_2(k)$, and $Z_3(k)$ represent states of the observer and are respectively estimated values of X(k−d), $\Delta(k-d)$, and H(k−d), and $L_1$, $L_2$, and $L_3$ represent gains of the observer.

step 4: calculating a predicted value $\hat{X}(k)$ of a state of the system and a predicted value $\hat{\Delta}(k)$ of the kinematic uncertainty at a current moment according to the estimated values $Z_1(k)$ $Z_2(k)$, and $Z_3(k)$ in step 3 and the discrete-time state-space model in step 2; step 5: designing a compound controller $U(k)=B^{-1}(-\hat{\Delta}(k)-K\hat{X}(k))$ according to the predicted values $\hat{X}(k)$ and $\hat{\Delta}(k)$ obtained in step 4 and based on a feedback linearization algorithm, where K represents a parameter of the controller.

X(k), U(k), $\Delta(k)$, and Y(k) in the discrete-time state-space model in step 2 are respectively expressed as:

$$X(k) = \begin{bmatrix} x_1(k) \\ x_2(k) \end{bmatrix}, U(k) = \begin{bmatrix} u_1(k) \\ u_2(k) \end{bmatrix}, \Delta(k) = \begin{bmatrix} \Delta_1(k) \\ \Delta_2(k) \end{bmatrix}, Y(k) = \begin{bmatrix} y_1(k) \\ y_2(k) \end{bmatrix},$$

where $x_1(k)$ and $x_2(k)$ respectively represent components of the miss distance of the tracked target in a yaw direction and a pitch direction, $u_1(k)$ and $u_2(k)$ respectively represent a pitch angular velocity and a yaw angular velocity of the camera, $\Delta_1(k)$ and $\Delta_2(k)$ respectively represent kinematic uncertainty of the system in the yaw direction and kinematic uncertainty of the system in the pitch direction, and $y_1(k)$ and $y_2(k)$ respectively represent measured values of the components of the miss distance of the tracked target in the yaw direction and the pitch direction.

The control input matrix B in the discrete-time state-space model in step 2 is:

$$B = \begin{bmatrix} 0 & -T\lambda m \\ T\lambda m & 0 \end{bmatrix},$$

where T represents a sampling period of discretization of the system, $\lambda$ represents the focal length of the camera, and m represents a ratio of one meter to the side length of a pixel.

The kinematic uncertainty H(k) and $Z_1(k)$, $Z_2(k)$, and $Z_3(k)$ in the observer in step 3 are respectively expressed as:

$$H(k) = \begin{bmatrix} h_1(k) \\ h_2(k) \end{bmatrix}, Z_1(k) = \begin{bmatrix} z_{11}(k) \\ z_{12}(k) \end{bmatrix}, Z_2(k) = \begin{bmatrix} z_{21}(k) \\ z_{22}(k) \end{bmatrix}, Z_3(k) = \begin{bmatrix} z_{31}(k) \\ z_{32}(k) \end{bmatrix},$$

where $h_1(k)$ and $h_2(k)$ respectively represent differences of uncertainty in a yaw direction and uncertainty in a pitch direction, $z_{11}(k)$ and $z_{12}(k)$ respectively represent estimated values of state variables $x_1(k-d)$ and $x_2(k-d)$, $z_{21}(k)$ and $z_{22}(k)$ respectively represent estimated values of uncertainty $\Delta_1(k-d)$ and uncertainty $\Delta_2(k-d)$ and $z_{31}(k)$ and $z_{32}(k)$ respectively represent estimated values of differences $h_1(k-d)$ and $h_2(k-d)$ of uncertainty.

$L_1$, $L_2$, and $L_3$ of the observer in step 3 are respectively:

$$L_1 = \begin{bmatrix} l_{11} & 0 \\ 0 & l_{12} \end{bmatrix}, L_2 = \begin{bmatrix} l_{21} & 0 \\ 0 & l_{22} \end{bmatrix}, L_3 = \begin{bmatrix} l_{31} & 0 \\ 0 & l_{32} \end{bmatrix},$$

where $l_{11}$, $l_{12}$, $l_{21}$, $l_{22}$, $l_{31}$, and $l_{32}$ represent parameters of the gains of the observer, a characteristic root of a square matrix $$\begin{bmatrix} -L_1 & I & O \\ -L_2 & I & I \\ -L_3 & O & I \end{bmatrix}$$

is within a unit circle, and I and O respectively represent a second-order identity matrix and a second-order zero matrix.

A specific process of calculating the predicted value $\hat{\Delta}(k)$ of the kinematic uncertainty and the predicted value $\hat{X}(k)$ of the state at the current moment in step 4 is as follows:

$$\begin{cases} \hat{\Delta}(k) = Z_2(k) + d \cdot Z_3(k) \\ \hat{X}(k) = Z_1(k) + d \cdot Z_2(k) + \frac{d(d-1)}{2} \cdot Z_3(k) + \sum_{m=0}^{d-1} BU(k-1-m) \end{cases}.$$

The compound controller in step 5 is specifically expressed as:

$$K = \begin{bmatrix} k_1 & 0 \\ 0 & k_2 \end{bmatrix},$$

where $k_1$ and $k_2$ represent to-be-designed parameters of the controller and satisfy: $0 < k_1, k_2 < 1$.

Beneficial effects of the present invention are as follows:

In the present invention, an improved generalized proportional integral observer is used to estimate a state, kinematic uncertainty, and a difference at a previous moment in an electro-optical tracking system, a state and uncertainty of the system at a current moment are predicted according to the obtained estimation information, and a compound controller is designed in combination with a feedback linearization algorithm. The method mitigates the adverse impact of visual-measurement time lag on tracking performance and enhances the uncertainty suppression and the tracking precision of the system.

DETAILED DESCRIPTION

The present invention is further described below with reference to the accompanying drawings and specific implementation. It should be understood that the following specific implementations are merely intended to describe the present invention rather than to limit the scope of the present invention.

A method for compensating for visual-measurement time lag of an electro-optical tracking system includes specific steps as follows:

Step 1: Install a camera on a pitch inner frame of a two-axis inertially stabilized platform, connect the camera to a host computer to form an electro-optical tracking system, shoot, by the camera, a tracked target in real time, extract, by the host computer, a miss distance of the tracked target according to an image shot by the camera, and generate, by the two-axis inertially stabilized platform, a control input of the system according to the miss distance.

Figure 1A:
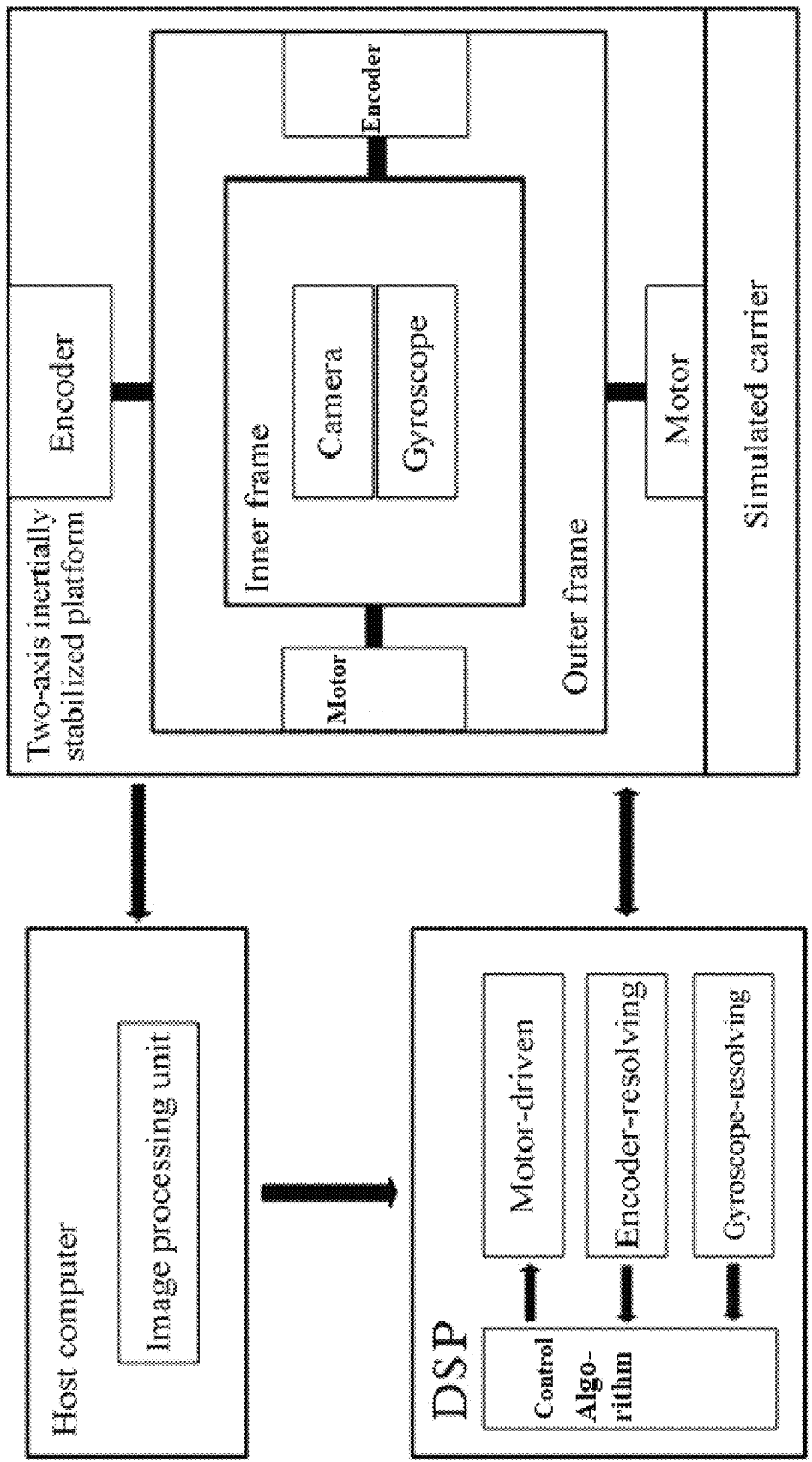
FIG. 1(a) is a structural diagram of an electro-optical tracking system according to the present invention.
Figure 1B:
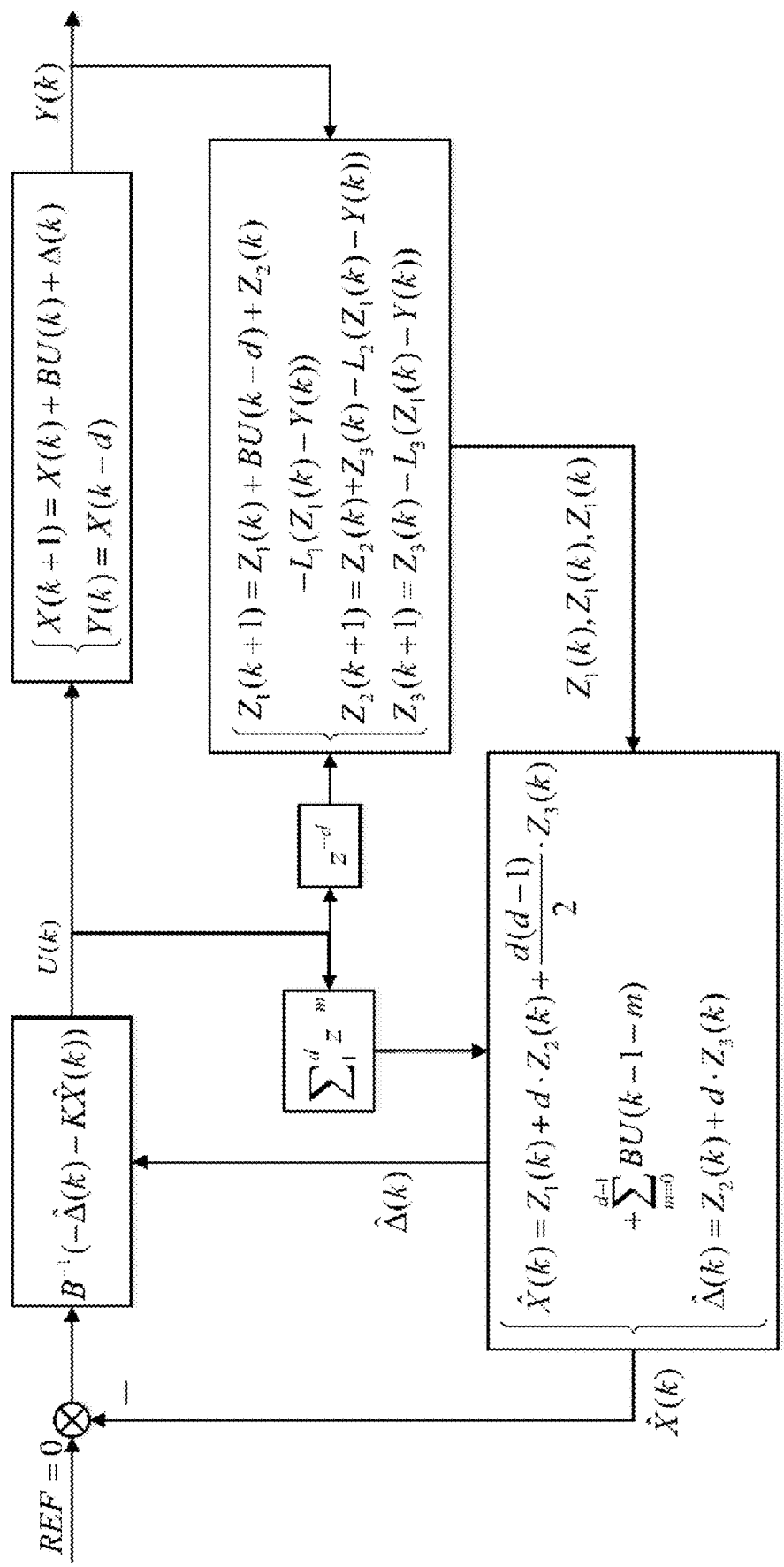
FIG. 1(b) is a block diagram of a method for compensating for visual-measurement time lag of an electro-optical tracking system of the present invention.
Figure 2A:
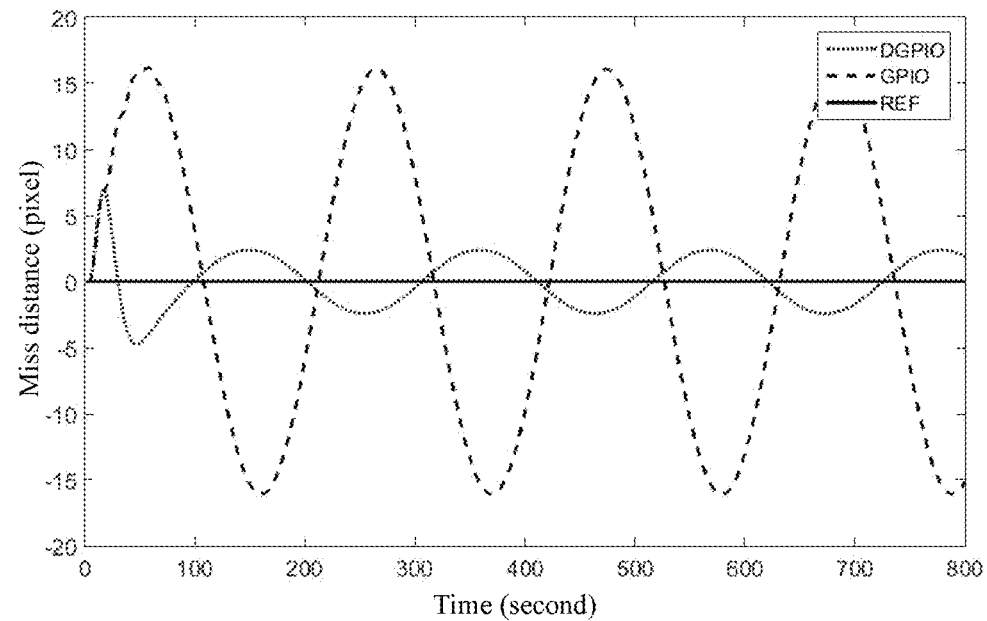
FIG. 2(a) is a comparison diagram of the effect of controlling a miss distance between a DGPIO method that considers measurement time lag and a GPIO method that does not consider measurement time lag under the same visual-measurement time lag and kinematic uncertainty.
Figure 2B:
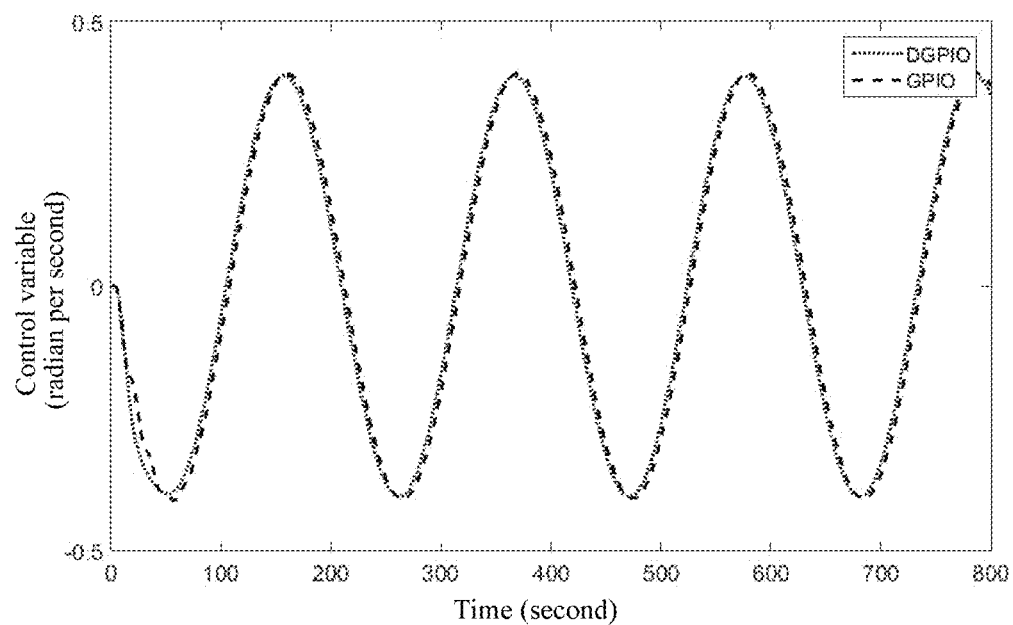
FIG. 2(b) is a comparison diagram of control variables between a DGPIO method that considers measurement time lag and a GPIO method that does not consider measurement time lag under the same visual-measurement time lag and kinematic uncertainty.

As shown in FIG. 1(a), the two-axis inertially stabilized platform includes a yaw outer frame and a pitch inner frame. The camera is installed on the pitch inner frame. In this system, a desktop computer is used as the host computer. Real-time data acquired by the camera is connected to the host computer through a data cable. The host computer extracts the miss distance of the tracked target according to obtained picture information. The host computer sends the miss distance to a control chip (digital signal processor, DSP) through the data cable. The control chip calculates information about the control input of the system according to encoder information and gyroscope information. A torque motor generates corresponding torque.

Step 2: Select the miss distance of the tracked target as a state of the system, and establish a discrete-time state-space model considering visual-measurement time lag and kinematic uncertainty of the system, for example:

$$\begin{cases} X(k+1) = X(k) + BU(k) + \Delta(k) \\ Y(k) = X(k-2) \end{cases},$$

where X(k) represents the state of the system, U(k) represents the control input of the system, $\Delta(k)$ represents the kinematic uncertainty of the system, Y(k) represents a measurement output of the system, B represents a control input matrix, and k represents a $k^{th}$ moment.

In the model, X(k), U(k), $\Delta(k)$, and Y(k) are respectively expressed as:

$$X(k) = \begin{bmatrix} x_1(k) \\ x_2(k) \end{bmatrix}, U(k) = \begin{bmatrix} u_1(k) \\ u_2(k) \end{bmatrix}, \Delta(k) = \begin{bmatrix} \Delta_1(k) \\ \Delta_2(k) \end{bmatrix}, Y(k) = \begin{bmatrix} y_1(k) \\ y_2(k) \end{bmatrix},$$

where $x_1(k)$ and $x_2(k)$ respectively represent components of the miss distance of the tracked target in a yaw direction and a pitch direction, $u_1(k)$ and $u_2(k)$ respectively represent a pitch angular velocity and a yaw angular velocity of the camera, $\Delta_1(k)$ and $\Delta_2(k)$ respectively represent kinematic uncertainty of the system in the yaw direction and kinematic uncertainty of the system in the pitch direction, $y_1(k)$ and $y_2(k)$ respectively represent measured values of the components of the miss distance of the tracked target in the yaw direction and the pitch direction, and the control input matrix B and the kinematic uncertainty $\Delta(k)$ are respectively as follows:

$$B = \begin{bmatrix} 0 & -280 \\ 280 & 0 \end{bmatrix}, \Delta(k) = \begin{bmatrix} \Delta_1(k) \\ \Delta_2(k) \end{bmatrix} = \begin{bmatrix} 15\sin(0.1k)+5 \\ 15\sin(0.1k)+5 \end{bmatrix}.$$

Step 3: Define $H(k)=\Delta(k+1)-\Delta(k)$ as a difference of the kinematic uncertainty of the system, and construct, according to the discrete-time state-space model established in step 2, an improved generalized proportional integral observer:

$$\begin{cases} Z_1(k+1) = Z_1(k) + BU(k-2) + Z_2(k) - L_1(Z_1(k)-Y(k)) \\ Z_2(k+1) = Z_2(k) + Z_3(k) - L_2(Z_1(k)-Y(k)) \\ Z_3(k+1) = Z_3(k) - L_3(Z_1(k)-Y(k)) \end{cases},$$

where $Z_1(k)$, $Z_2(k)$, and $Z_3(k)$ represent states of the observer and are respectively estimated values of $X(k-2)$, $\Delta(k-2)$, and $H(k-2)$, and $L_1$, $L_2$, and $L_3$ represent gains of the observer. Specific selection is as follows:

$$L_1 = \begin{bmatrix} 1/2 & 0 \\ 0 & 1/2 \end{bmatrix}, L_2 = \begin{bmatrix} 3/4 & 0 \\ 0 & 3/4 \end{bmatrix}, L_3 = \begin{bmatrix} 1/8 & 0 \\ 0 & 1/8 \end{bmatrix}.$$

Step 4: Calculate a predicted value $\hat{X}(k)$ of a state of the system and a predicted value $\hat{\Delta}(k)$ of the kinematic uncertainty at a current moment according to the estimated values $Z_1(k)$, $Z_2(k)$ and $Z_3(k)$ in step 3 and the discrete-time state-space model in step 2. A specific process of calculating the predicted values is as follows:

$$\hat{\Delta}(k) = Z_2(k) + 2 \cdot Z_3(k)$$

$$\hat{X}(k) = Z_1(k) + 2 \cdot Z_2(k) + Z_3(k) + \sum_{m=0}^{1} BU(k-1-m).$$

Step 5: Design a compound controller $U(k)=B^{-1}(-\hat{\Delta}(k)-K\hat{X}(k))$ according to the predicted values $\hat{X}(k)$ and $\hat{\Delta}(k)$ obtained in step 4 and based on a feedback linearization algorithm, where K is specifically as follows:

$$K = \begin{bmatrix} 1/2 & 0 \\ 0 & 1/2 \end{bmatrix}.$$

In the drawings, DGPIO represents the foregoing method, and REF represents a reference signal of the system.

The effectiveness and advantage of the present invention are described by using a comparative experiment below. Control variables generated in the two methods are basically kept the same for the rationality of comparison. A generalized proportional integral observer-based control method designed for an electro-optical tracking system without considering visual-measurement time lag as follows:

Step 1: Select the miss distance of the tracked target as a state of the system, and establish a discrete-time state-space model of the system that does not consider visual-measurement time lag but considers kinematic uncertainty as follows:

$$\begin{cases} X(k+1) = X(k) + BU(k) + \Delta(k) \\ Y(k) = X(k) \end{cases}.$$

Step 2: Construct, according to the discrete-time state-space model established in step 1, an improved generalized proportional integral observer:

$$\begin{cases} Z_1(k+1) = Z_1(k) + BU(k) + Z_2(k) - L_1(Z_1(k)-Y(k)) \\ Z_2(k+1) = Z_2(k) + Z_3(k) - L_2(Z_1(k)-Y(k)) \\ Z_3(k+1) = Z_3(k) - L_3(Z_1(k)-Y(k)) \end{cases},$$

where $L_1$, $L_2$, and $L_3$ represent gains of the observer. Specific selection is as follows:

$$L_1 = \begin{bmatrix} 1/2 & 0 \\ 0 & 1/2 \end{bmatrix}, L_2 = \begin{bmatrix} 3/4 & 0 \\ 0 & 3/4 \end{bmatrix}, L_3 = \begin{bmatrix} 1/8 & 0 \\ 0 & 1/8 \end{bmatrix}.$$

Step 3: Design a compound controller $U(k)=B^{-1}(-Z_2(k)-KZ_1(k))$ according to the estimated values $Z_1(k)$ and $Z_2(k)$ in step 2 and based on a feedback linearization algorithm. K is specifically as follows:

$$K = \begin{bmatrix} 1/2 & 0 \\ 0 & 1/2 \end{bmatrix}.$$

In the drawings, GPIO represents the generalized proportional integral observer-based control method designed without considering visual-measurement time lag.

The technical means disclosed in the solutions of the present invention are not limited to the technical means disclosed in the foregoing technical means, but also include technical solutions including any combination of the foregoing technical features.

With the foregoing preferred embodiment according to the present invention as enlightenment, through the foregoing description, a related worker can make various changes and modifications without departing from the scope of the technical idea of the present invention. The technical scope of the present invention is not limited to the content of the description, and the technical scope of the present invention needs to be determined according to the scope of the claims.

What is claimed is:

1. A method for compensating for visual-measurement time lag of an electro-optical tracking system, comprising the following steps:

step 1: installing a camera on a pitch inner frame of a two-axis inertially stabilized platform, connecting the camera to a host computer to form an electro-optical tracking system, shooting, by the camera, a tracked target in real time, extracting, by the host computer, a miss distance of the tracked target according to an image shot by the camera, and generating, by the two-axis inertially stabilized platform, a control input of the system according to the miss distance;

step 2: selecting the miss distance of the tracked target as a state of the system, and establishing a discrete-time state-space model considering visual-measurement time lag and kinematic uncertainty of the system, for example:

$$\begin{cases} X(k+1) = X(k) + BU(k) + \Delta(k) \\ Y(k) = X(k-d) \end{cases},$$

wherein $X(k)$ represents the state of the system, $U(k)$ represents the control input of the system, $\Delta(k)$ represents the kinematic uncertainty of the system, $Y(k)$ represents a measurement output of the system, d represents the visual-measurement time lag, B represents a control input matrix, and k represents a $k^{th}$ moment;

step 3: defining $H(k)=\Delta(k+1)-\Delta(k)$ as a difference of the kinematic uncertainty of the system, and constructing, according to the discrete-time state-space model established in step 2, an improved generalized proportional integral observer:

$$\begin{cases} Z_1(k+1) = Z_1(k) + BU(k-d) + Z_2(k) - L_1(Z_1(k) - Y(k)) \\ Z_2(k+1) = Z_2(k) + Z_3(k) - L_2(Z_1(k) - Y(k)) \\ Z_3(k+1) = Z_3(k) - L_3(Z_1(k) - Y(k)) \end{cases},$$

wherein $Z_1(k)$, $Z_2(k)$, and $Z_3(k)$ represent states of the observer and are respectively estimated values of $X(k-d)$, $\Delta(k-d)$, and $H(k-d)$, and $L_1$, $L_2$, and $L_3$ represent gains of the observer;

step 4: calculating a predicted value $\hat{X}(k)$ of a state of the system and a predicted value $\hat{\Delta}(k)$ of the kinematic uncertainty at a current moment according to the estimated values $Z_1(k)$ $Z_2(k)$, and $Z_3(k)$ in step 3 and the discrete-time state-space model in step 2; and step 5: designing a compound controller $U(k)=B^{-1}(-\hat{\Delta}(k)-K\hat{X}(k))$ according to the predicted values $\hat{X}(k)$ and $\hat{\Delta}(k)$ obtained in step 4 and based on a feedback linearization algorithm, wherein K represents a parameter of the controller.

2. The method for compensating for visual-measurement time lag of an electro-optical tracking system according to claim 1, wherein $X(k)$, $U(k)$, $\Delta(k)$, and $Y(k)$ in the discrete-time state-space model in step 2 are respectively expressed as:

$$X(k) = \begin{bmatrix} x_1(k) \\ x_2(k) \end{bmatrix}, U(k) = \begin{bmatrix} u_1(k) \\ u_2(k) \end{bmatrix}, \Delta(k) = \begin{bmatrix} \Delta_1(k) \\ \Delta_2(k) \end{bmatrix}, Y(k) = \begin{bmatrix} y_1(k) \\ y_2(k) \end{bmatrix},$$

wherein $x_1(k)$ and $x_2(k)$ respectively represent components of the miss distance of the tracked target in a yaw direction and a pitch direction, $u_1(k)$ and $u_2(k)$ respectively represent a pitch angular velocity and a yaw angular velocity of the camera, $\Delta_1(k)$ and $\Delta_2(k)$ respectively represent kinematic uncertainty of the system in the yaw direction and kinematic uncertainty of the system in the pitch direction, and $y_1(k)$ and $y_2(k)$ respectively represent measured values of the components of the miss distance of the tracked target in the yaw direction and the pitch direction.

3. The method for compensating for visual-measurement time lag of an electro-optical tracking system according to claim 1, wherein the control input matrix B in the discrete-time state-space model in step 2 is:

$$B = \begin{bmatrix} 0 & -T\lambda m \\ T\lambda m & 0 \end{bmatrix},$$

wherein T represents a sampling period of discretization of the system, $\lambda$ represents the focal length of the camera, and m represents a ratio of one meter to the side length of a pixel.

4. The method for compensating for visual-measurement time lag of an electro-optical tracking system according to claim 1, wherein the kinematic uncertainty $H(k)$ and $Z_1(k)$ $Z_2(k)$, and $Z_3(k)$ in the observer in step 3 are respectively expressed as:

$$H(k) = \begin{bmatrix} h_1(k) \\ h_2(k) \end{bmatrix}, Z_1(k) = \begin{bmatrix} z_{11}(k) \\ z_{12}(k) \end{bmatrix}, Z_2(k) = \begin{bmatrix} z_{21}(k) \\ z_{22}(k) \end{bmatrix}, Z_3(k) = \begin{bmatrix} z_{31}(k) \\ z_{32}(k) \end{bmatrix},$$

wherein $h_1(k)$ and $h_2(k)$ respectively represent differences of uncertainty in a yaw direction and uncertainty in a pitch direction, $z_{11}(k)$ and $z_{12}(k)$ respectively represent estimated values of state variables $x_1(k-d)$ and $x_2(k-d)$, $z_{21}(k)$ and $z_{22}(k)$ respectively represent estimated values of uncertainty $\Delta_1(k-d)$ and uncertainty $\Delta_2(k-d)$ and $z_{31}(k)$ and $Z_{32}(k)$ respectively represent estimated values of differences $h_1(k-d)$ and $h_2(k-d)$ of uncertainty.

5. The method for compensating for visual-measurement time lag of an electro-optical tracking system according to claim 1, wherein the gains $L_1$, $L_2$, and $L_3$ of the observer in step 3 are respectively:

$$L_1 = \begin{bmatrix} l_{11} & 0 \\ 0 & l_{12} \end{bmatrix}, L_2 = \begin{bmatrix} l_{21} & 0 \\ 0 & l_{22} \end{bmatrix}, L_3 = \begin{bmatrix} l_{31} & 0 \\ 0 & l_{32} \end{bmatrix},$$

wherein $l_{11}$, $l_{12}$, $l_{21}l_{22}$, $l_{31}$ and $l_{32}$ represent parameters of the gains of the observer, a characteristic root of a square matrix $$\begin{bmatrix} -L_1 & I & O \\ -L_2 & I & I \\ -L_3 & O & I \end{bmatrix}$$

is within a unit circle, and I and O respectively represent a second-order identity matrix and a second-order zero matrix.

6. The method for compensating for visual-measurement time lag of an electro-optical tracking system according to claim 1, wherein a specific process of calculating the predicted value $\hat{\Delta}(k)$ of the kinematic uncertainty and the predicted value $\hat{X}(k)$ of the state at the current moment in step 4 is as follows:

$$\hat{\Delta}(k) = Z_2(k) + d \cdot Z_3(k)$$

$$\hat{X}(k) = Z_1(k) + d \cdot Z_2(k) + \frac{d(d-1)}{2} \cdot Z_3(k) + \sum_{m=0}^{d-1} BU(k-1-m).$$

7. The method for compensating for visual-measurement time lag of an electro-optical tracking system according to claim 1, wherein the compound controller in step 5 is specifically expressed as:

$$K = \begin{bmatrix} k_1 & 0 \\ 0 & k_2 \end{bmatrix},$$

wherein $k_1$ and $k_2$ represent to-be-designed parameters of the controller and satisfy: $0<k_1,k_2<1$.

* * * * *